Oct. 7, 1958  H. J. TYLER ET AL  2,855,154

THERMOSTATICALLY CONTROLLED FLUID VALVES

Filed June 28, 1956

INVENTORS.
Hugh J. Tyler &
Frank V. Mingrone.
BY
*Robert J. Henderson*
THEIR ATTORNEY.

United States Patent Office 2,855,154
Patented Oct. 7, 1958

2,855,154

THERMOSTATICALLY CONTROLLED FLUID VALVES

Hugh J. Tyler, Jeannette, Pa., and Frank V. Mingrone, Milford, Conn., assignors to Robertshaw-Fulton Controls Company, Greensburg, Pa., a corporation of Delaware Application June 28, 1956, Serial No. 594,496

4 Claims. (Cl. 236—99)

This invention relates to thermostatically controlled fluid valves and more particularly to a thermostatically controlled water valve that is adapted to control the flow of fluid to a vehicle heater or heat exchanger in response to changes in a temperature of a medium flowing over the heat exchanger.

The primary object of this invention is the construction of a thermostatically controlled fluid valve having a heat range capable of adjustment to selectively vary the flow capacity of the valve. With the heat range capable of adjustment, the valve can be set to deliver a predetermined amount of fluid to the heat exchanger and thereby control the maximum temperature of the medium being heated by the heat exchanger.

Another object of the invention is to eliminate the use of a fixed-pivot valve member control lever in a thermostatically controlled fluid valve.

Another object of the invention is to selectively vary the heat range of a thermostatically controlled fluid valve by shifting the axis of rotation of the valve member control lever.

Another object of the invention is to utilize only a single spring in a thermostatically controlled fluid valve to provide a plurality of functions.

Another object of the present invention is to calibrate a thermostatically controlled fluid valve by shifting the axis of rotation of the valve member control lever.

Other objects and advantages of the present invention will become apparent from the following description taken in connection with the accompanying drawing wherein.

While this invention is particularly adapted for use in combination with an automotive vehicle heating system, it is to be understood that the invention is not to be limited to this particular environmental application since the invention is capable of any application where it is desirable to use a thermostatically controlled fluid valve provided with an adjustable heat range.

Figure 1:
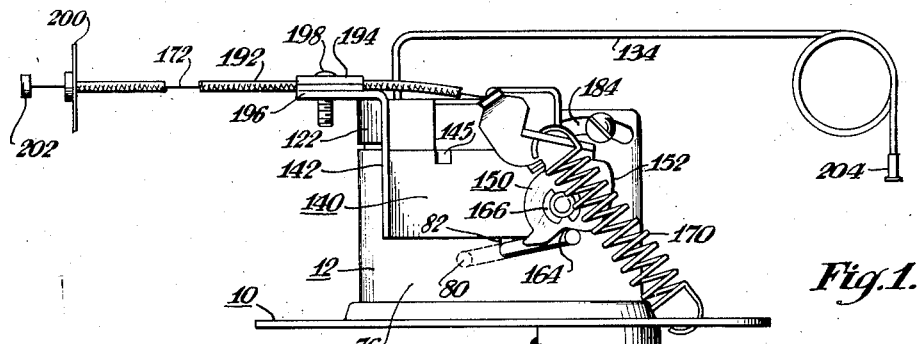
Fig. 1 is a side elevation including the cam arm, control cable and sensing element.
Figure 2:
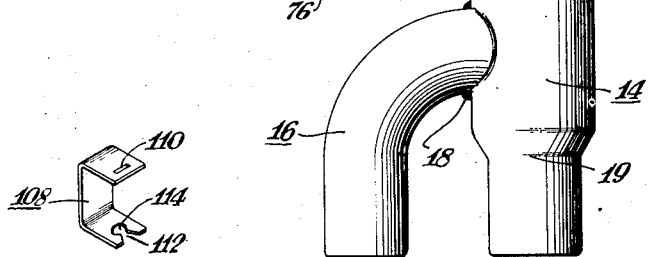
Fig. 2 is a longitudinal section through the device shown by Fig. 1, the section being rotated 180°.

Referring more particularly to the drawing, Figs. 1 to 5 inclusive, show a preferred embodiment of the present invention wherein the thermostatically controlled fluid valve comprises a mounting plate 10 having a U-shaped frame member 12 mounted on the upper side thereof and carrying a tubular valve housing 14 on the under side thereof. A tubular inlet conduit 16 extends through the wall of valve housing 14 and is secured thereto by any suitable means, such as brazing or welding. A welding or brazing fillet 18 is shown in Figs. 1 and 2. The valve housing 14 is reduced in diameter at 19 to provide an outlet.

Disposed within the interior of valve housing 14 is an apertured valve seat 20. Valve seat 20 is secured to the inner wall of casing 14 by any suitable means, preferably welding or brazing, a fillet being shown at 22.

As shown in Fig. 2, a valve member generally designated by the reference numeral 24 is also disposed within housing 14 and is adapted to move within the housing between a plurality of controlling positions to control the flow of fluid therethrough. The valve member 24 includes a disc seal 26 carried by an annular flange 27 formed on a centrally located body member 28 surrounded by an annular guide 30. The annular guide 30 retains disc 26 in position on body member flange 27 and is connected to body member 28 by any suitable means. Disc seal 26 engages the valve seat 20 when the valve member 24 is moved to the closed position so as to completely obstruct the flow of fluid through valve housing 14.

The valve member 24 is carried by a valve stem 32 having a spherical head 34 on the lower end thereof as viewed in Fig. 2. The spherical head 34 on the valve stem 32 is seated within a socket or recess 33 formed in valve member body member 28. Socket or recess 33 thus formed defines a thin-shelled wall 35 on the upper portion of body member 28. The spherical head 34 is retained in the socket 33 by any suitable means, preferably by spinning the thin-shelled wall 35 of the body member 28 into engagement with the surface of spherical head 34.

Adjacent the upper end thereof, viewing Fig. 2, the valve stem 32 is provided with a relatively large annular recess 36 and a small annular recess 38. Adjacent the recess 38, the valve stem 32 is also provided with a reduced diameter portion 40 terminating in a spherical head 42 formed on the upper end of the stem.

Valve casing 14 is adapted to be carried by a concentrically reduced circular plate generally designated by the reference numeral 44. One of the concentric reductions in plate 44 defines a cylindrical wall 46 which is adapted to closely fit within the inner bore of housing 14. Housing 14 is secured to the plate 44 by any suitable means, preferably welding or brazing, a fillet being shown at 48. Another of the cylindrical reductions in plate 44 defines an outer cylindrical wall 50, the end face of which abuts the underside of plate 10 and is secured thereto by any suitable means. Plate 44 is also provided with a centrally disposed aperture 52 therein to accommodate the movement therethrough of valve stem 32.

A seal generally designated by the reference numeral 54 surrounds the upper portion of the valve stem 32. The seal 54 includes a bead portion 56 which is anchored in the space between the wall 50 of plate 44 and the bottom surface of mounting plate 10. Integrally formed with bead portion 56 is a web portion 58 which terminates in an annular central portion 60 surrounding the upper portion of the stem 32. An annular ring 62 tightly engages the periphery of seal portion 60 and produces therein an annular inwardly deflected portion 64 which tightly anchors the seal 54 to the valve stem 32, the annular deflected portion 64 being seated in the annular recess 36 in the stem. Surrounding the portion 60 of the seal 54 and engaging the periphery of annular ring 62 is a generally cup-shaped annular member 66 adapted to shield the exposed upper end of the seal 54. Cup-shaped member 66 is provided with an aperture 68 therein, the aperture 68 being slightly larger in diameter than the diameter of stem 32.

The cup-shaped member 66, the seal 54 and the valve stem 32 are held in the assembled position by means of a resilient clip 70 adapted to seat in the annular recess 38 in the stem 32. In assembling these components, member 66 is slipped over the spherical head 42 of the stem 32 and then pushed axially along stem 32 to produce a slight compression in portion 60. In this compressed state of the seal 54, clip 70 is inserted into recess 38 to anchor member 66 in its protective position.

Mounting plate 10 is also provided with an opening 72 therein through which the upper portion of the stem 32 and the components attached thereto may reciprocate as the valve member 24 moves between its controlling positions. It will also be noted that the web portion 58 of the seal 54 is constantly flexed as the valve member 24 moves toward the open position.

Figure 3:
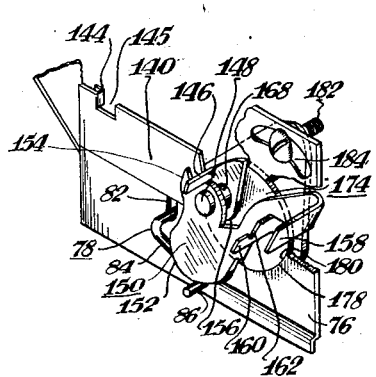
Fig. 3 is a perspective view of the cam arm and rotatable calibration plate and parts operatively associated therewith.

The U-shaped frame member 12 is comprised of a ceiling portion 74 and a pair of opposed side wall members 76, only one side wall member 76 being shown. Extending between side wall members 76 and carried thereby is a crank 78 having a single-throw 80 formed intermediate the ends thereof, the single-throw 80 positioned between side wall members 76 and shown in dotted lines in Fig. 1. One end of the crank (not shown) projects through a circular aperture (not shown) in one of the side wall members 76 and is rotatably journaled therein. In the opposite side wall member 76, the crank 78 projects through an elongated aperture 82 to be slidably and rotatably journaled therein, the elongated aperture 82 being clearly shown in Figs. 1 and 3. Adjacent the point of projection through aperture 82, the crank 78 (as best shown in Fig. 3) is formed with a right angular bent portion 84 which terminates in a small tang 86 bent approximately at a right angle to the axis of bent portion 84.

Adapted to be controlled by crank 78 is a valve member control lever generally designated by the reference numeral 88 and shown only in Fig. 2. Control lever 88 comprises a floor portion 90 and a pair of opposed wall portions 92, only one wall portion 92 being shown. Intermediate the ends thereof, control lever 88 is provided with a pair of U-shaped notches 94 extending upwardly into the wall portions 92, only one U-shaped notch 94 being shown. The U-shaped notches 94 provide a means for journaling the control lever 88 on the crank throw 80, the control lever 88 thereby being pivotally attached to the crank 78 for a combination of translatory and rotary movement therewith.

Adjacent its left end 96, as viewed in Fig. 2, control lever 88 engages the upper spherical end 42 of the valve stem 32. Inwardly and adjacent the point of control with spherical end 42 of the valve stem 32, control lever 88 is provided with a transversely extending recess 98 therein. The transversely extending recess 98 is adapted to seat a plurality of conical-shaped projections 100 formed on one side of a substantially L-shaped link 102, only one of the projections being shown. The projections 100 enable the link 102 to be pivotally supported on the floor portion 90 of control lever 88. Link 102 has integrally formed at one end thereof a small projection or tab 104 and adjacent the opposite end thereof is recessed to provide a seat 106 for a power means, the power means to be discussed more in detail hereinafter.

Figure 4:
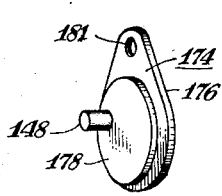
Fig. 4 is a perspective view of the C-shaped clamp shown in Fig. 2.

Adapted to engage link 102 and operatively connect link 102 to valve stem 32 is a clamp means or C-shaped clamp generally designated by the reference numeral 108 and shown in Figs. 2 and 4. The clamp 108 has a small slot 110 extending therethrough adjacent one end and, at the opposite end, is provided with a V-shaped notch 112 formed therein, the V-shaped notch 112 terminating in a circular aperture 114. As can best be seen in Fig. 2, the small slot 110 in clamp 108 is adapted to receive the tab 104 on link 102 to operatively connect the link 102 and clamp 108, whereas the aperture 114 at the opposite end of clamp 108 is adapted to be positioned on the underside of spherical head 42 on the upper end of the valve stem 32.

The aperture 114 in clamp 108 is slightly larger in diameter than the reduced diameter portion 40 of valve stem 32 to facilitate the assembly of clamp 126 thereon. Aperture 114 also provides an increased area of contact between the clamp 108 and the lower surface of the spherical head 42 of the valve stem 32, this increased area of contact being particularly important when control lever 88 is rotated clockwise as viewed in Fig. 2 to move valve member 24 toward the closed position. As control lever 88 is moved clockwise, the increased surface areas afforded by aperture 114 will tend to apply the forces moving the valve member 24 substantially along the axis of movement of the valve member and thereby eliminate any binding or improper seating of the valve member.

The spring seat 106 of link 102 is adapted to seat one end of a power means, in this instance a single compression spring 116. The opposite end of the compression spring 116 is seated around an annular flange 118 formed in the canopy portion 120 of a housing member 122 mounted on the ceiling 74 of C-shaped frame member 12, the housing member 122 to be described more in detail hereinafter. With compression spring 116 seated on the spring seat 106, it can readily be seen that this compression spring 116 provides a plurality of functions. In addition to biasing the link 102 in a clockwise direction and operatively connecting control lever 88 to valve stem 32, the spring 116 constantly biases control lever 88 in a counterclockwise direction and holds several of the components of the valve in assembled engagement. The assembled engagement of link 102, clamp 108 and valve stem 32 and the assembled engagement of control lever 88 and crank throw 80 are both effected by the force of spring 116.

Disposed above the right end 124 of control lever 88 in ceiling 74 of C-shaped frame member 12, as best seen in Fig. 2, is a thermostatic element generally designated by the reference numeral 126. The thermostatic element 126 comprises a body member 128 which houses the stem of a reciprocable piston 130 movable into and out of body portion 128 in response to changes in a temperature condition. The thermostatic element 126 is, furthermore, provided with an upper cylindrical portion 132 into which projects one end of a capillary tube 134, the capillary tube 134 extending through a hole 133 in housing member 122. The capillary 134 contains a liquid which changes in volume upon a change in a temperature condition and thus imparts movement to the piston 130 to effect rotation of control lever 88. Inasmuch as thermostatic elements of this type are well known in the art, further discussion concerning the structure and function thereof is deemed unnecessary.

Portion 128 of thermostatic element 126 is adapted to project downwardly through an aperture 136 in roof 74 of C-shaped frame member 12, aperture 136 being positioned so that the piston 130 of the thermostatic element will be in alignment with a raised portion 138 formed on the control lever 88 adjacent the right end 124 thereof. Thus, viewing Fig. 2, it can readily be seen that as the liquid in capillary 134 expands due to an increase in a temperature condition, piston 130 will be moved downwardly and tend to rotate control lever 88 in a clockwise direction, the clockwise movement of control lever 88 moving valve member 24 toward its closed position.

Pivotally attached to the outer surface of one of the frame member walls 76 is a substantially rectangular shaped bracket 140 having an L-shaped extension 142 on the left end thereof as viewed in Fig. 1. As best shown in Fig. 3, bracket 140 is pivotally attached to wall 76 by means of an ear 144 struck from the body of the bracket. The ear 144 extends into a hole 145 in frame wall 76 and is clenched along the inner surface of the wall to provide a loose pivotal connection between bracket 140 and wall 76, the pivotal connection quite obviously permitting only a limited rotary movement of the bracket.

Adjacent its right end, viewing Fig. 3, bracket 140 is provided with another ear 146 struck from the body of the bracket and extending transversely thereof. Bracket 140 also receives a transversely extending pin 148, the pin supporting and fixing the position of bracket 140 and anchored in another of the components of the valve as will be explained more in detail hereinafter.

As best seen in Figs. 1 and 3, the rotation of crank 78 and the resultant shift in position of the pivotal axis of control lever 88 is produced by a cam means or cam arm generally designated by the reference numeral 150. The cam arm 150 is irregular in shape and is rotatably mounted on transversely extending pin 148. Along one edge thereof, viewing Figs. 1 and 3, cam arm 150 is provided with a suitably shaped cam surface 152 that slidably and rotatably engages the tang 86 on the end of crank 78. With the cam surface 152 constantly in engagement with crank tang 86, it can readily be seen that the rotation of cam arm 150 will produce a corresponding rotation of crank 78 and shift the position of crank throw 80 to thereby shift the position of the axis of rotation of control lever 88.

As best seen in Fig. 3, irregular shaped cam arm 150 is provided with a projection 154 thereon which is adapted to engage ear 146 on bracket 140 and limit the clockwise rotation of the cam arm. Cam arm 150 is also deeply cut-away at 156 to form another stop adapted to engage bracket ear 146 and limit the counterclockwise rotation of the cam arm. At one extremity, the cam arm 150 is provided with an extension 158 integrally formed therewith and extending substantially at a right angle thereto. Adjacent extension 158, cam arm 150 is also provided with another integral transverse extension 160 having a V-shaped notch 162 therein, and as best seen in Fig. 1, the cam surface 152 of cam lever 150 terminates in a substantially V-shaped notch 164.

As shown in Fig. 1, cam arm 150 is retained on pin 148 by a resilient clip 166 seated in an annular recess in pin 148, the annular recess not being shown. As best shown in Fig. 3, an annular spacer member 168 carried by pin 148 separates cam arm 150 and bracket 140 and thereby prevents any binding or interference between the bracket and cam arm.

The cam arm 150 is rotated by means of a control cable 172 attached to cam arm extension 158 as shown in Fig. 1, the control cable 172 to be discussed more in detail hereinafter. Suffice it to say that counterclockwise rotation of cam lever 150 is produced by pulling on the control cable 172 whereas clockwise rotation of cam lever 150 is produced by pushing on control cable 172. To prevent buckling of the control cable 172 when the cam arm 150 is rotated in a clockwise direction, the cam arm 150 is constantly urged in a clockwise direction, viewing Fig. 1, by a tension spring 170 having one end hooked in the V-shaped notch 162 in cam arm transverse extension 160 and having the opposite end anchored in an aperture in mounting plate 10, the aperture not being shown.

Figure 5:
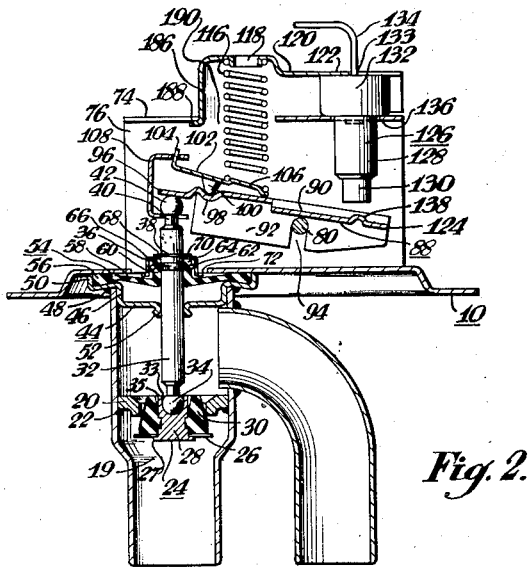
Fig. 5 is a perspective view of the rotatable calibration plate shown in Fig. 3.

To insure accuracy of operation, the valve is provided with a calibration means generally designated by the reference numeral 174 and best shown in Figs. 3 and 5. The calibration means comprises a plate 176 having an annular disc 178 secured to one face thereof, the annular disc 178 being secured to the plate 176 by any suitable means or formed integral therewith. The annular disc 178 is adapted to be journaled in an aperture 180 of suitable size in frame side wall 76 to thereby define the axis of rotation of the calibration means.

As best shown in Fig. 5, the calibration means 174 also carries the pin 148 on which the cam arm 150 is rotatably mounted. Pin 148 is anchored to the disc 178 of the calibration means eccentric to the axis of rotation or geometric center of the disc. The pin 148 may be anchored to the disc 178 by any suitable means or may be formed integral therewith.

Plate 176 is also provided with a threaded aperture 181 which receives a bolt 182. The bolt 182 is adapted to ride in an arcuate-shaped, elongated slot 184 formed in frame side wall 76 as the plate 176 is rotated. Rotation of the calibration means 174 can be prevented by merely tightening the bolt 182 to draw the plate 176 tightly into engagement with frame wall 76.

The eccentric positioning of pin 148 on disc 178 is particularly important since it enables the position of the cam arm 150 to be shifted upon rotation of the calibration means 174. Shifting the position of the cam arm 150 produces rotation of the crank 78 and thereby shifts the position of crank throw 80 to shift the pivotal axis of the control lever 88. It will readily be understood that shifting the position of crank throw 80, also, simultaneously shifts the position of control lever 88 and the position of the valve member 24 relative to its seat, thereby requiring either more or less downward movement of the thermostatic element piston 130 to move the valve member 24 to the closed position. If the crank throw 80 is shifted downwardly, viewing Figs. 1 and 2, the piston 130 must move downwardly over a larger increment of its total stroke to effect sufficient rotation of control lever 88 to move the valve member 24 to the closed position. If the crank throw 80 is shifted upwardly, the control lever 88 and the valve member 24 are also moved upwardly and the piston 130 has to move through a much shorter increment of its total stroke to move the valve member 24 to the closed position.

In view of the foregoing, the valve can be calibrated to effect movement of the valve member 24 into engagement with its seat at any desired maximum temperature of the air discharged by the heat exchanger or at any desired maximum extended position of the thermostatic element piston 130 by first rotating the cam arm 150 to a position corresponding to the maximum temperature of the air discharged by the heat exchanger and then rotating the calibration means 174 in a counterclockwise direction as seen in Fig. 1 until the crank throw 80 effects sufficient rotation of the control lever 88 about extended thermostatic element piston 130 to move the valve member 24 into engagement with its seat.

Mounted on top of C-shaped frame member 12 on the outer surface of ceiling 74 and housing the upper portion 132 of thermostatic element 126 is a channel-shaped housing member 122. Housing member 122 may be secured to ceiling 74 by any suitable means. Integrally formed with housing member 122 and extending longitudinally of frame member 12 is a canopy portion 120. As hereinbefore mentioned, canopy portion 120 is provided with an annular flange 118 therein providing a spring seat for compression spring 116. Adjacent annular flange 118, canopy portion 120 is provided with an angular-bent portion 186 terminating in another angular-bent portion 188. Bent portion 186 of canopy 120 extends downwardly through a hole 190 in frame ceiling 74 and the angular-bent portion 188 extends along and is secured to the inner surface of ceiling 74 by any suitable means. It will also be noted that hole 190 in frame ceiling 74 receives compression spring 116.

A control cable 172 enclosed in a sheath 192 has one end attached to the transverse extension 158 at the upper end of cam arm 150 as viewed in Fig. 1. The control cable 172 and sheath 192 are retained in a suitable operating position by a clamp 194 cooperating with longitudinally extending portion 196 of the L-shaped extension 142 of wall bracket 140, the clamp 194 being retained on longitudinally extending portion 196 by means of a screw 198. The opposite end of the control cable 172 preferably extends to the dashboard 200 in the vehicle passenger compartment and has a control knob 202 mounted on the free end thereof. If it is desired to rotate the cam arm 150 in a counterclockwise direction, the occupant of the passenger compartment merely has to pull on control knob 202, whereas if it is desired to rotate the cam arm 150 in a clockwise direction the occupant of the passenger compartment merely has to push on the control knob 202.

As shown in Fig. 1, the capillary 134 is provided with a temperature sensing bulb 204 on the free end thereof. Although not shown in the drawing, the bulb 204 is positioned adjacent the discharge side of the heater or heat exchanger in the stream of heated air entering the passenger compartment. By placing the bulb 204 in this position, the valve member 24 will move between its controlling positions in response to changes in temperature of the air entering the passenger compartment to accurately regulate the flow of fluid to the heat exchanger.

While the preferred embodiment of the invention in Fig. 1 shows the use of a temperature sensing bulb 204 on the free end of the capillary 134, the bulb 204 can be eliminated by coiling the capillary 134 several times into a tight loop (not shown in the drawing) and disposing the loop in the desired temperature sensing position, i. e., in the stream of heated air entering the passenger compartment. The use of a coiled loop type of capillary enjoys the particular advantage of concentrating a large percentage of the liquid in the capillary 134 in the temperature sensing position to thereby increase the operational accuracy of the thermostatic element piston 130 in response to temperature variations.

A portion of the capillary 134 may be reversely bent and fastened by any suitable means to an arm (not shown) that may extend transversely of portion 196 of a bracket L-shaped extension 142. Attaching a portion of the capillary 134 to an arm on bracket extension portion 196 stabilizes the capillary 134 and prevents breakage or rupture of the capillary at the point where it enters the upper cylindrical portion 132 of thermostatic element 126 or the hole 133 in the housing member 122.

Operation

Viewing Figs. 1 and 2, the thermostatically controlled fluid valve is shown as being operated at the maximum heat range, i. e., the valve member 24 is in its wide open position and a maximum flow of fluid is being delivered to the heat exchanger. With the valve member 24 in its wide open position, it can readily be seen that the crank throw 80 or the axis of rotation of control lever 88 is in its lowermost position relative to the thermostatic element piston 130 and that the cam arm 150 has been rotated a maximum distance counterclockwise. With the various components of the valve in the positions shown by Figs. 1 and 2, it will also be understood that the air will be supplied to the passenger compartment at a maximum temperature and that the thermostatic element piston 130 will have to move downwardly over a very large increment of its total stroke to effect sufficient rotation of the control lever 88 to move the valve member 24 into engagement with its seat. Thus, with the valve member 24 initially set at its wide open position, the air supplied to the passenger compartment will be elevated to a maximum temperature and the valve member 24 will be automatically controlled to maintain this maximum temperature.

On the other hand, should there be less demand for heat in the passenger compartment of the vehicle, for instance, when the temperature of the outside atmosphere is relatively warm, it becomes necessary to change the heat range of the thermostatically controlled valve. The heat range can be changed or predetermined by merely pushing on control knob 202 to rotate cam arm 150 in a clockwise direction as seen in Fig. 1. Viewing Figs. 1 and 2, it can be seen that clockwise rotation of cam arm 150 produces a similar clockwise rotation of crank 78 and thereby shifts the position of crank throw 80 upwardly, the upward movement of crank throw 80 moving the control lever 88 upwardly and moving the valve member 24 closer to its seat. With the valve member 24 initially positioned closer to its seat, the flow of water to the heat exchanger is reduced and the temperature of the air entering the passenger compartment will be correspondingly reduced to a predetermined degree.

With the cam arm 150 rotated clockwise from the position shown in Fig. 1 and the crank throw 80 shifted upwardly from the position shown in Fig. 2, it can also be readily seen that the thermostatic element piston 130 has to move downwardly a much shorter distance to effect sufficient rotation of control lever 88 to move valve member 24 into engagement with its seat. Thus, with the valve member 24 initially set in a position closer to its seat, the air will be supplied to the passenger compartment at a predetermined lower temperature and will be automatically controlled to maintain this predetermined lower temperature.

The present invention, therefore, enables the occupant of a passenger compartment of a vehicle to select the heat range of a valve compatible with the atmospheric temperature by merely pushing or pulling the control cable 172 to vary the position of cam arm 150. When the position of cam arm 150 has been changed, the valve will automatically maintain the temperature of the air entering the passenger compartment within the desired temperature range.

To insure accuracy of operation of the thermostatically controlled fluid valve and especially to insure the closing of the valve member 24 when the temperature of the air entering the passenger compartment acquires a predetermined degree, it is essential that the thermostatically controlled valve be properly calibrated. Therefore, to properly calibrate the operation of the thermostatically controlled valve, viewing Fig. 1, the bulb 204 of the capillary is first exposed to a maximum predetermined temperature to extend thermostatic element piston 130, the maximum predetermined temperature usually corresponding to the desired maximum temperature of the air entering the passenger compartment. The cam arm 150 is then moved to the maximum counterclockwise position as shown in Fig. 1 to move the valve member 24 toward its seat. If in the extreme counterclockwise position of cam arm 150 the valve member 24 does not move into tight engagement with its seat, calibration disc 174 then is moved in a counterclockwise direction, as viewed in Fig. 1, until the valve member tightly engages its seat and the raised portion 138 of control lever 88 abuts the underneath surface of thermostatic element piston 130. With raised portion 138 of the control lever 88 now in engagement with the thermostatic element piston 130, it will be appreciated that any further increase in temperature at capillary bulb 204 will further extend piston 130 and merely serve to move valve member 24 into tighter engagement with its seat 20.

While only one embodiment of the present invention has been shown and described herein, it will be apparent that various changes may be made in the form and arrangement of parts and the details of construction herein disclosed without departing from the scope of the invention as defined in the appended claims.

It is claimed and desired to secure by Letters Patent:

1. A thermostatically controlled fluid valve comprising a casing having inlet and outlet passages intersected by a valve seat, a valve member movable between controlling positions relative to said seat, a valve stem carried by said valve member and movable therewith, a rotatable crank having an eccentric portion intermediate the ends thereof, a control lever pivoted on said eccentric portion and having operative engagement with said valve stem, a link pivotally mounted on said control lever, clamp means operatively connecting said link and said valve stem, resilient means engaging said link and operatively interconnecting said clamp means and said control lever for unit movement, said resilient means biasing said control lever in one direction of rotation for moving said valve member to one of said positions, thermally responsive means operative for rotating said control lever in the opposite direction and thereby moving said valve member to another of said positions, cam means operatively engaging said crank and movable between a plurality of positions to rotate said crank and selectively shift the position of said valve member relative to said seat, and calibration means forming a pivotal support for said last named means and movable through a predetermined range of movement to shift the position of said last named means and the position of said eccentric portion of said crank.

2. A thermostatically controlled fluid valve comprising a casing having inlet and outlet passages intersected by a valve seat, a valve member movable between controlling positions relative to said seat, a valve stem carried by said valve member and movable therewith, a rotatable crank having an eccentric portion intermediate the ends thereof, a control lever pivoted on said eccentric portion and having operative engagement with said valve stem, a link pivotally mounted on said control lever, clamp means operatively connecting said link and said valve stem, resilient means engaging said link and operatively interconnecting said clamp means and said control lever for unit movement, said resilient means biasing said control lever in one direction of rotation for moving said valve member to one of said positions, thermally responsive means operative for rotating said control lever in the opposite direction and thereby moving said valve member to another of said positions, cam means operatively engaging said crank and movable between a plurality of positions to rotate said crank and selectively shift the position of said valve member relative to said seat to vary the flow capacity of said valve, and rotatable calibration means pivotally supporting said cam means, said cam means being pivotally attached to said calibration means eccentric to the axis of rotation of said calibration means and said calibration means being operative on rotation thereof to shift the position of said cam means and rotate said crank to vary the axis of rotation of said control lever and the position of said valve member relative to said seat.

3. In a thermostatically controlled fluid valve, the combination comprising a casing having an inlet and an outlet for fluid therein intersected by a valve seat, a valve member in said casing movable between open and closed positions relative to said valve seat, a valve stem carried by said valve member, a rotatable crank carried by said casing and having a throw intermediate the ends thereof, a control lever rotatably mounted on said crank throw and being operatively connected to said valve stem, resilient means operable between said casing and said control lever to move said valve member in one direction relative to said seat, means cooperable with said control lever for moving said valve member in the opposite direction relative to said seat, a calibration plate carried by said casing for rotation about a fixed axis, and cam means eccentrically mounted for rotation on said calibration plate and being operatively engageable with said crank for imparting rotation thereto, said calibration plate being operable upon rotation thereof to shift the position of said cam means relative to said crank to thereby impart rotation to said crank.

4. In a thermostatically controlled fluid valve, the combination comprising a casing having an inlet and an outlet for fluid therein intersected by a valve seat, a valve member in said casing movable between open and closed positions relative to said valve seat, a valve stem carried by said valve member, frame means carried by said casing and having an aperture therein, a rotatable crank carried by said frame means and having a throw intermediate the ends thereof, a control lever rotatably mounted on said crank throw and being operatively connected to said valve stem, resilient means operable between said casing and said control lever to move said valve member in one direction relative to said seat, thermally responsive means cooperable with said control lever for imparting rotation thereto in response to changes in a temperature condition to thereby move said valve member in the opposite direction relative to said seat, a disc journalled in said aperture in said frame means for rotation about a fixed axis, a calibration plate carried by said disc and being rotatable therewith, a pin carried by said disc eccentric to the axis of rotation thereof, a cam lever rotatably mounted on said pin and having a cam surface thereon engageable with said crank for imparting rotation thereto upon rotation of said cam lever to translate the position of said control lever relative to said thermally responsive means to thereby vary the ranges of temperature variations within which said control lever moves said valve member between said open and closed positions, said calibration plate being operable upon rotation thereof to shift the position of said cam lever relative to said crank and impart rotation to said crank, and locking means associated with said frame means and said calibration plate.

References Cited in the file of this patent
UNITED STATES PATENTS

| | | |
|---|---|---|
| 1,376,462 | Robertshaw | May 3, 1921 |
| 2,575,081 | Watkins | Nov. 13, 1951 |
| 2,663,499 | Schutt | Dec. 22, 1953 |